W. H. COTTON.
STOCK TANK.
APPLICATION FILED MAY 3, 1920.

1,383,530.

Patented July 5, 1921.

Inventor:
Walter H. Cotton
By
Att'ys.

UNITED STATES PATENT OFFICE.

WALTER H. COTTON, OF CHICAGO, ILLINOIS.

STOCK-TANK.

1,383,530.　　　　Specification of Letters Patent.　　Patented July 5, 1921.

Application filed May 3, 1920. Serial No. 378,452.

*To all whom it may concern:*

Be it known that I, WALTER H. COTTON, a citizen of the United States, and resident of Chicago, county of Cook, and State of Illinois, have invented certain new and useful Improvements in Stock-Tanks, of which the following is a specification and which are illustrated in the accompanying drawings, forming a part thereof.

The invention relates to watering tanks for farm stock; its object being to provide a tank in which the water may be kept warm in the winter time, the heating apparatus being incorporated into and forming an integral part of the tank.

This object is attained in the structure hereinafter described and which is illustrated in the accompanying drawings, in which—

Figure 1:
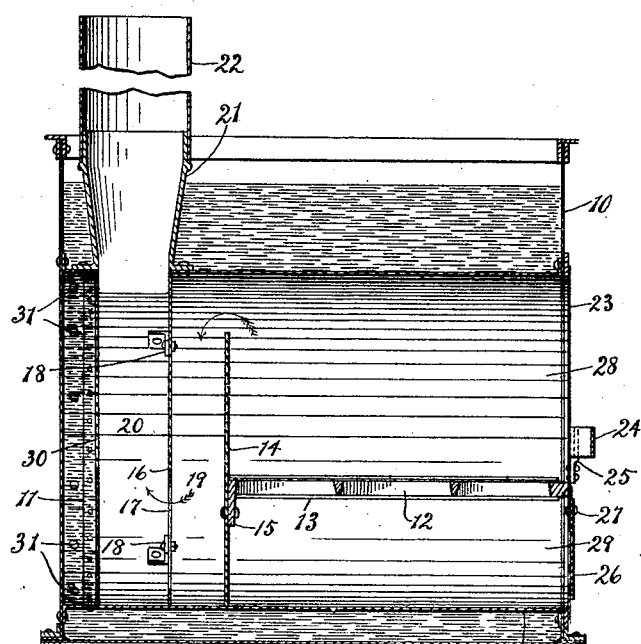
Figure 1 is a vertical section view through the tank and its heater.
Figure 2:
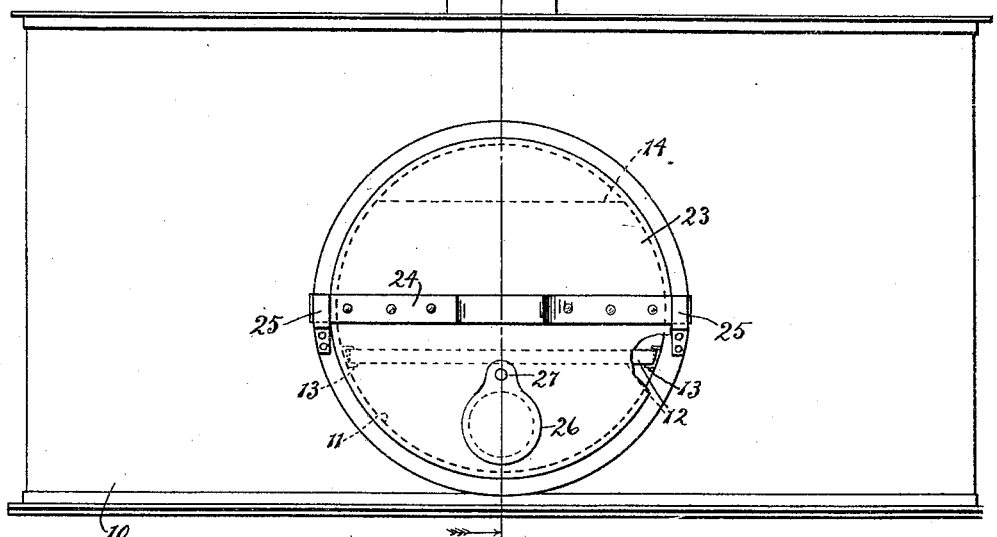
Fig. 2 is an end elevation.

The body of the tank is shown at 10 and as being made of sheet iron and being rectangular in form. Within this body is fixed a sheet metal casing 11, preferably in cylindrical form and extending from side wall to side wall of the tank, the attachment thereof being water tight. At one end of this casing the side wall of the tank is cut away, and within the casing is located a grate 12 for carrying fuel, this grate being mounted and slidable upon longitudinally disposed brackets 13, 13, secured to the side wall of the casing in any suitable manner.

To the rearward end of the grate 12 there is secured a vertical baffle plate 14, which fits slidingly against the wall of the casing, its upper portion, however, being cut away to provide flue space. The attachment of the plate 14 to the grate 12 is through the medium of a plate 15 secured to both of these members. A short distance back of the plate 14 when the latter is in the position of service there is located a permanent partition 16, which snugly fits the walls of the casing 11 except that at its bottom portion it is cut away to provide draft space, as shown at 17. The attachment of the partition 16 to the casing is preferably by means of lugs 18. A chimney flue 21 leads upwardly from the compartment of the casing 11 back of the partition 16, and is preferably provided with a removable extension 22 of suitable length.

The opening through the wall of the tank 10 at the front end of the casing 11 may be closed by a door plate 23, conveniently held in place by means of a handle bar 24, riveted across it and adapted to fit into bracket loops 25 secured to the wall of the tank. A damper 26 is pivotally attached, as shown at 27, to the lower portion of the door 23 to cover a suitable draft opening for the admission of air to support combustion on the grate.

The casing 11 is located a little above the bottom of the tank to permit the water to circulate entirely around it, and preferably a partition 30 is placed across its rear end to form in effect the end of the heater, the side walls of the casing being cut away or perforated, as shown at 31, to permit the water to circulate between this partition and the side wall of the tank.

By the construction described there is formed a combustion chamber 28 in the forward end of the casing 11, and above the grate 12 an ash-pit 29 below the grate, and flue passages 19, 20, the one between the plate 14 and the partition 16 and the other between the partitions 16 and 30.

When it is desired to supply the heater with fuel the door 23 is lifted off, and in order to remove the ash from the pit 29 the grate 12 and plate 14 are drawn forwardly, the latter carrying the ash with it and discharging it upon the ground. This ash removing operation may be performed without disturbing the burning fire carried by the grate.

I claim as my invention—

A farm stock tank comprising a body having an aperture in one of the walls, a casing permanently secured within the body and alined with the aperture, horizontal ways forward on the side walls of the casing and extending inwardly from the aperture, a fuel grate slidably supported by the ways, a plate attached to the rear end of the grate and slidably engaging the bottom and sides of the casing but providing a draft passage at its top, a partition crossing the the casing back of the plate and having a draft opening at its lower portion, and a smoke stack leading from the casing back of the partition.

WALTER H. COTTON.